United States Patent [19]

Adachi et al.

[11] Patent Number: 4,461,797

[45] Date of Patent: Jul. 24, 1984

[54] POLYESTER FILM WITH PROJECTIONS AND DEPRESSIONS ON THE SURFACE

[75] Inventors: Tomio Adachi, Sagamihara; Hideo Katoh, Kanagawa; Atsushi Yamamoto, Sagamihara, all of Japan

[73] Assignee: Teijin Limited, Osaka, Japan

[21] Appl. No.: 311,330

[22] Filed: Oct. 14, 1981

[30] Foreign Application Priority Data

Oct. 15, 1980 [JP] Japan .................. 55-142871

[51] Int. Cl.$^3$ .............................. G11B 5/70
[52] U.S. Cl. .................... 428/147; 428/156; 428/323; 428/331; 428/480; 428/900; 428/910
[58] Field of Search ........... 428/900, 147, 331, 323, 428/480, 156, 910

[56] References Cited

U.S. PATENT DOCUMENTS 4,304,807 12/1981 Kawakami et al. ............. 428/694
4,348,446 9/1982 Mitsuishi et al. ................ 428/148

FOREIGN PATENT DOCUMENTS 2350160 5/1974 Fed. Rep. of Germany .

Primary Examiner—George F. Lesmes
Assistant Examiner—P. R. Schwartz
Attorney, Agent, or Firm—Wenderoth, Lind & Ponack

[57] ABSTRACT

A polyester film characterized by having many uneven units on its surface, each of said uneven units being composed of a fine projection and a depression existing therearound, and a process for producing aforesaid polyester film, which comprises pre-heating an unstretched polyester film containing internal particles attributed to an inert additive having an average particle diameter of 0.05 to 5 μm and/or a catalyst residue to a temperature of 80° to 120° C.; stretching the film in a first axial direction to 2.6 to 3.5 times at a temperature of 110° to 145° C.; thereafter, stretching the film in a second axial direction at right angles to the first axial direction to 3.0 to 4.0 times at a temperature of 100° to 150° C.; and then heat-setting the stretched film at a temperature of 160° to 240° C.

2 Claims, 8 Drawing Figures

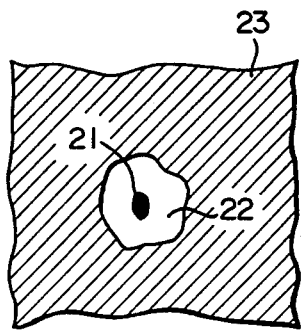
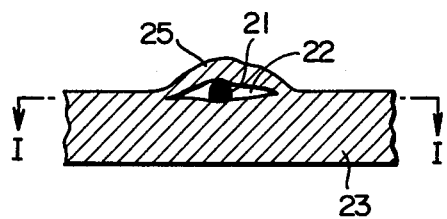
Fig. 1-1
Fig. 1-2
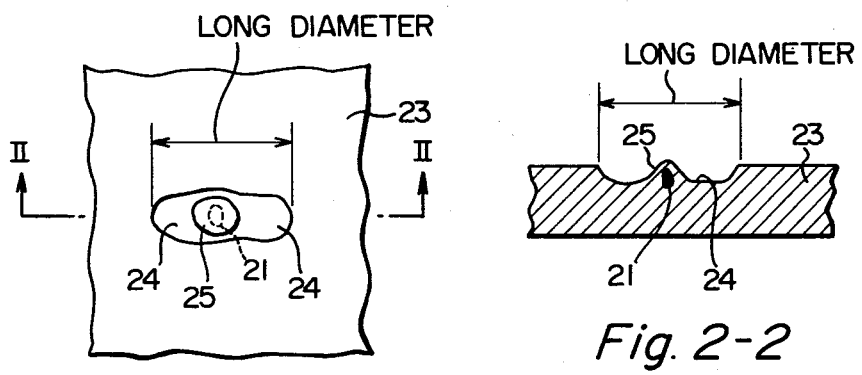
Fig. 2-1
Fig. 2-2
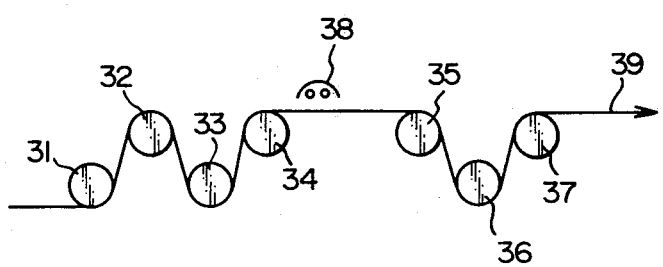
Fig. 3

POLYESTER FILM WITH PROJECTIONS AND DEPRESSIONS ON THE SURFACE

This invention relates to a polyester film having a smooth surface and a low coefficient of friction.

Polyester films have found extensive use as magnetic tapes and in electrical applications. For use as magnetic tapes, especially as videotapes, the films are required to have smooth surface in order to improve their electromagnetic converting characteristics, and a low coefficient of friction in order to improve the travelling characteristics of the tapes on a deck and their abrasion resistance and durability.

One previously known method for reducing the friction coefficient of a film is to provide the surface of the film with projections by molding a polymer containing inorganic particles, or a polymer having formed therein polymer-insoluble catalyst residue particles. The purpose of this method is to reduce the area of contact between the film and an object with which it makes contact and to reduce the coefficient of friction, by forming the projections on the film surface. This prior method involves positively forming projected portions on the film surface, and in order to reduce the coefficient of friction, it is effective to form as many high projections as possible on the film surface. Although the coefficient of friction can be reduced with an increase in the number of high projections, the effect of the projections appears also on the coated surface of a magnetic film obtained by coating the film with a magnetic powder. This is very likely to aggravate the electromagnetic converting characteristics of the film.

It is an object of this invention therefore to provide a base film which is suitable for obtaining a magnetic tape having excellent electromagnetic converting characteristics and a low coefficient of friction.

The present inventors have now found that this object can be achieved by forming a number of uneven units each consisting of a fine projection and a fine depression around it.

Thus, according to this invention, there is provided a polyester film having on its surface a number of uneven units composed of a projection and a depression existing around it. The depression is formed in elliptical shape around the projection, and the long diameter of the ellipse is 2 to 50 microns. The depression is attributed to an inert inorganic compound (additive) or a catalyst residue present in the film. The long diameter of the depression extends in the stretching direction of the film.

While according to the prior art, projections are formed on the surface of a film by adding an inert inorganic compound (such as silica, clay, titania, etc.) or an organic compound (such as calcium terephthalate, a high-melting polyester, etc.) and/or utilizing a catalyst residue in order to obtain an easily slippable film, the film of the present invention is characterized by the fact that both raisings (projections) and depressions are formed on the surface of the film. The advantage of the film of the invention having both projections and depressions is that it shows an easily slipping effect by having a much lower coefficient of friction than films obtained by the prior art and having only projections on the surface.

Examples of polyesters which can be used to produce the film of the invention are polymers or copolymers obtained by the polycondensation of aromatic dibasic acids such as terephthalic acid, isophthalic acid and napthalene-2,6-dicarboxylic acid and glycols such as ethylene glycol, tetramethylene glycol and neopentyl glycol. Typical examples are homopolymers such as polyethylene terephthalate, polybutylene terephthalate and polyethylene-2,6-naphthalenedicarboxylate, copolymers obtained by partially modifying these homopolymers, and polymer blends such as a blend of polyethylene terephthalate and (ethylene terephthalate/polyethylene glycol) block copolymer. Needless to say, the homopolymers or copolymers may contain fillers, pigments, antioxidants, photostabilizers, etc.

The projections formed on the surface of the film in the present invention are particles of an inorganic or organic compound added to the polymer, particles of an insoluble catalyst residue formed during polymer formation, or mixed particles of these.

The depressions existing around the projections are not those obtained by mechanical stamping such as embossing, but those which are generated by the deformation of the film itself in the step of stretching the film.

The projections and depressions in the film of this invention are described below with reference to the accompanying drawings in which:

FIG. 1-1 is a cross sectional view of a film showing a void formed around a particle when the film is stretched by a conventional method (along line I—I in FIG. 1-2);

FIG. 1-2 is a longitudinal sectional view of a film similar to that shown in FIG. 1-1;

FIG. 2-1 is a top plan view of the film of the invention, and

FIG. 2-2 is a longitudinal sectional view (taken along line II—II of FIG. 2-1) of the film of the invention.

Figure 4:
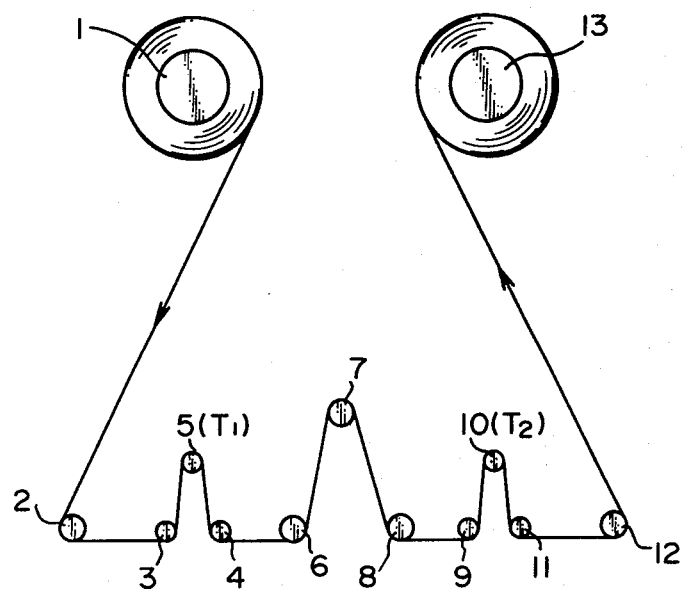

Usually, when an unstretched film containing particles is stretched in a first axial direction, the particles are not deformed but the polymer is deformed plastically. Hence, as a result of large deformation (stretching), voids are formed between the polymer and the particles. When the film containing the voids is then stretched in a direction (second axial direction) substantially at right angles to the first axial direction to form a biaxially oriented film, the voids formed during the stretching in the first axial direction are deformed in the second axial direction, whereby, as shown in FIG. 1-1, a pseudo-circular void 22 is formed around a particle 21 within a film 23. As shown in FIG. 1-2, the particle 21 and the void 22 which exist in a shallow part of the film near its surface gives a projection 25 having the particle as a nucleus to the surface of the film 23, but no depression is formed around the particle.

The characteristic feature of the invention is that the voids existing in the film are changed to depressions existing on the film surface. By prescribing the temperature of preheating an unstretched film prior to stretching in the first axial direction at a high point, and/or the stretch ratio at a low value, the film which has undergone stretching in the first axial direction does not substantially form voids around the particles (external particles of the inorganic or organic compound added or internal particles containing the catalyst residue). When the stretched film in this state is stretched in the second axial direction, depressions having the particles as nuclei are formed on the surface of the film in the second axial direction. The long diameter of each of the elliptical depressions will therefore extend along the second axial direction.

Even if voids are formed slightly around the particles during stretching in the first axial direction, depressions occur with these particles acting as nuclei.

The surface of the film which has been biaxially stretched is in the state shown in FIG. 2-1 (top plan view) and FIG. 2-2 (sectional view), and the projection 25 containing the particle 21 and the depression 24 formed around the projection are formed on the surface of the polyester film 23. When the stretching conditions are such that the stretching in the second axial direction results in concentration of a stress on the particle 21 as a center, the depression becomes deep according to the degree of stress concentration, and its long diameter tends to increase along the second axial direction.

The present invention includes those films in which a depression formed around the projection is of a pseudo-elliptical shape which is displaced toward the second axial direction.

If the longest straight line segment passing through the center of the depression and terminating at its periphery as shown in FIG. 2-1 is defined as the long diameter of the depression, the long diameter of the depression should be at least 2 μm in view of the improvement of the travelling characteristics of a magnetic tape and its electromagnetic converting characteristics. If the long diameter exceeds 50 μm, dropout in the magnetic tape increases, and the film is not desirable as a base film for magnetic tapes.

The polyester film of this invention gives a magnetic tape having excellent travelling characteristics and electromagnetic converting characteristics when there is the following relation between the long diameter D (μm) of a depression in each uneven unit and the frequency N(per mm$^2$) of occurrence of uneven units.

When $2 \leq D < 5$, $200 \leq N < 3500$,
when $5 \leq D < 10$, $150 \leq N < 2000$,
when $10 \leq D < 30$, $50 \leq N < 800$, and
$30 \leq D < 50$, $0 \leq N \leq 5$;
preferably
when $2 \leq D < 5$, $350 \leq N < 2500$,
when $5 \leq D < 10$, $250 \leq N < 1500$,
when $10 \leq D < 30$, $100 \leq N < 500$,
and
when $30 \leq D < 50$, $0 < N \leq 3$ It is theorized that the area of contact of the surface of the film of this invention is reduced because of the presence of the depressions, and as a result, its coefficient of friction is reduced.

Each uneven unit in accordance with this invention consists of one projection and one depression existing around it. The size of the uneven units and the frequency of their occurrence can be controlled depending upon the type of the particles, the amount of the particles in the polymer, the film stretching conditions, etc.

A specific method of stretching the polyester film of this invention is described below. An unstretched polyester film containing 0.01 to 2.0% by weight of fine particles of kaolin, silica, etc. having a particle diameter of 0.05 to 5 μm (preferably 0.1 to 2.5 μm) is pre-heated to 80° to 120° C. prior to stretching in a first axial direction. For the pre-heating, it is preferred to use a hard chrome-plated roll or ceramic roll whose surface has been matted. The unstretched film can attain a predetermined preheating temperature under conditions which do not cause substantial crystallization, without sticking to the roller surface. Of course, the unstretched film may be pre-heated without contacting any object. The unstretched film is then stretched in the first axial direction at a stretch ratio of not more than 3.2 (preferably 2.6 to 3.5) at a temperature of 110° to 145° C. The stretching speed is preferably as low as possible, and should not desirably exceed 150 meters/min. Usually, a stretching speed in the range of about 50 to 100 m/min. is selected. At a low speed, the stretching temperature can be lowered.

Then, the monoaxially oriented film is cooled to a temperature below the glass transition temperature of the polyester. Or without cooling, it is pre-heated to a temperature of 100° to 150° C., and stretched at a ratio of 3.0 to 4.0 (preferably 3.2 to 3.8) at substantially the same temperature. When the temperature of the second stretching is high, the boundaries between the depressions of the uneven units become clear, but at low temperatures, the boundaries are often not clear. The stretch ratio in the second axial direction does not markedly affect the frequency of occurrence of the uneven units. If the stretch ratio in the second direction is at least 3.8, the stretched film has a higher mechanical strength (Young's modulus) in the second axial direction than in the first axial direction to give a so-called tensilized film. In addition, the slippability of the film tends to be reduced.

If the biaxially stretched film has an insufficient mechanical strength in the first axial direction, it can be further stretched in this direction at a stretch ratio of about 1.2 to 1.6 at a temperature of about 120° to 170° C. to give a balanced film.

The biaxially oriented polyester film which has undergone two-stage, or if required three-stage, stretching can be heat-set at a temperature of 160° to 240° C. (preferably 190° to 210° C.) for about 0.2 to 30 seconds. If desired, the re-stretching in the third stage (in the first axial direction) may be performed after heat-setting.

By properly combining the aforesaid stretching conditions, there can be produced an easily slippable polyester film having uneven units in the desired frequency of occurrence.

In the present invention, the first axial direction may be the machine or transverse direction of the film. Desirably, the second axial direction is substantially at right angles to the first axial direction. The stretching may be carried out in three or more stages whereby the biaxially oriented film is further stretched in the first axial direction and/or the second axial direction. So long as the projections and depressions exist on the film surface, the electromagnetic converting characteristics of the magnetic tape and its travelling characteristics (low coefficients of friction) prove to be satisfactory even if the uneven units are deformed more or less.

The film stretching conditions for forming such surface depressions tend to render the film surface relatively smooth, and consequently, the electromagnetic converting characteristics of the film as a magnetic tape can be improved.

As a base film for magnetic tapes, the polyester film of this invention has the advantage that the relative flatness of its surface obviates occurrence of dropout or color noises during the formation of a magnetic recording layer thereon, the area of contact of the film with a magnetic head, guide rolls, or other films is further decreased because of the existence of depressions around the projections, and the easily slippering effect can be increased further by the presence of low projections existing on the film surface.

Another advantage of the polyester film of the invention is that since it has depressions on the surface in addition to the projections, its electromagnetic converting characteristics can be maintained at a higher level than conventional films having projections alone on their surfaces, and any adverse effect due to excessive uneven units can be avoided.

The present invention will now be illustrated more specifically by the following Examples and Comparative Examples taken in conjunction with the drawings.

Figure 5:
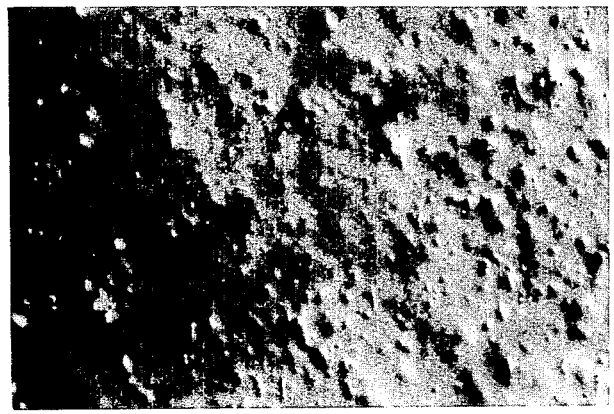
Figure 6:

In the drawings,

FIG. 3 is a diagrammatical side view of a stretching machine;

FIG. 4 is a diagrammatical side view of a tape base tester for measuring the coefficient ($\mu k$) of dynamic friction of a rough surface of a film;

FIG. 5 is a microphotograph (900×) of the surface of a polyester film in accordance with a conventional technique (Comparative Example 3); and FIG. 6 is a microphotograph (900×) of the surface of a polyester film in accordance with this invention (Example 2).

The various properties shown in the examples were measured by the following methods.

(1) Measurement of an uneven portion

A film having a thin aluminum layer vapor-deposited on its surface was photographed by using a differential interference microscopic device (e.g., Model R of a Nikon differential interference microscope), and the long diameter of a depression in each uneven portion was measured by a scale.

(2) CLA of surface roughness (The CLA (center line average) of a surface roughness was measured by the following method according to JIS B0601.

A surface-roughened film was measured by, for example, a needle pointer type surface roughness tester made by Tokyo Seimitsu K.K. (SURFCOM 3B), and its film roughness curve was determined under a load of 70 mg using a needle with a radius of 2 $\mu$m and recorded on a chart with a magnefication of 50 times along the base line on the film and 20000 times perpendicular to the plane of the film. From the profile roughness curve obtained by this measurement method, a portion corresponding to a measured length L (standard length 2 mm) was sampled. The portion of the profile curve is expressed by the equation Y=f(X), taking the center line of the portion as X axis and the direction of the vertical axis of the chart as Y axis, and CLA value is calculated according to the following equation and expressed in $\mu$m unit.

$$CLA = \frac{1}{L} \int_0^L f(x)\, dx$$

The measurement was done on eight samples. The three largest values were excluded, and the average of the remaining five measured values was calculated, and defined as CLA. The above measurement was done both in the longitudinal and transverse directions of the film, and the average of these was determined.

(3) Coefficient of friction

In an atmosphere kept at 25° C. and 60% RH, a film cut to a width of ½ inch was brought into contact at a winding angle of $\pi$ radian with a fixed rod made of 18-8 stainless steel (SUS 304) and having an outside diameter of 5 mm and a surface roughness CLA of 0.030 (micron) as shown in FIG. 4. In FIG. 4, 2 is a tension control means, 3, 4, 6, 8, 9 and 11 are free rollers, 7 is a fixed rod, 5 is a tension detector means (entrance side) and 10 is a tension detector means (exit side), 12 is a guide roller and 13 is a winding wheel. Such tape testing means is old as shown in U.S. Pat. No. 4,348,446, filed Sept. 4, 1980. The film was then moved at a speed of 3.3 cm/sec to cause friction. The coefficient of dynamic friction ($\mu k$) was calculated in accordance with the following equation in which T$_2$ in grams is the outlet tension detected by an outlet tension detector 10 when a tension controller 2 was adjusted so that the inlet tension T$_1$ detected by an inlet tension detector 5 was 30 g. The dynamic friction coefficient $\mu k$ in accordance with this invention is the one obtained when the film was caused to travel over 90 meters.

$$\mu k = \frac{1}{\pi} \ln \frac{T_2}{T_1}$$

(4) Chroma S/N

A tape coated with a magnetic layer was measured by the following method.

Using a home VTR, a signal resulting from superimposition of a 100% chroma level signal upon a 50% white signal was recorded, and its reproduction signal was measured by using a Shibasoku video noise meter 925C. The chroma S/N, according to the Shibasoku's definition, is as follows:

$$\text{Chroma } S/N = 20 \log \frac{ES(p-p)}{EN(\text{rms})} \text{ (dB)}$$

wherein

ES(p—p)=0.714 V(p—p), and

EN(rms)=the effective voltage of AM noise (V).

The coated tape was prepared by the following procedure.

A magnetic powder composition of the following formulation was coated on a film by a gravure roll, and the magnetic coated layer was smoothed by a doctor knife to adjust its thickness to about 5 $\mu$m. While the magnetic coating composition was still in the undried state, the coated layer was magnetically oriented. Then, the coated film was dry-cured in an oven. The film was then calendered to level the coated surface. Thus, a tape having a width of ½ inch was prepared.

| Formulation of the magnetic coating composition | |
|---|---|
| $\gamma$-Fe$_2$O$_3$ powder | 100 parts by weight |
| Vinyl chloride/vinyl acetate copolymer (S-lec A, a trademark for a product of Sekisui Kagaku Kogyo K.K.) | 16 parts by weight |
| Hycar-1432 J(a trademark for butadiene/acrylonitrile copolymer made by Nippon Zeon Co., Ltd.) | 11 |
| Lecithin | 1 |
| Carbon | 8 |
| Methyl ethyl ketone | 100 |
| Methyl isobutyl ketone | 100 |
| Silicone resin (lubricant) | 0.15 |

Examples 1 to 5 and Comparative Examples 1 to 4

Polyethylene terephthalate having an intrinsic viscosity of 0.65 dl/g (measured at 35° C. in ortho-chlorophenol) and containing 0.25% by weight of kaolin was dried at 160° C., melt-extruded at 280° C., and quenched and solidified on a casting drum kept at 50° C. to form an unstretched film having a thickness of 160 $\mu$m.

Subsequently, using the apparatus of FIG. 3, the unstretched film was preheated by four heated rollers 31, 32, 33 and 34 and stretched in the longitudinal direction between a roller 34 and a roller 35 and passed over rollers 36 and 37 and the stretched film 39 proceeds in the direction of the arrow shown in FIG. 3. Furthermore, the film was stretched to 3.6 times in the transverse direction at 105° C., and heat-treated at 210° C. The stretching speed in the longitudinal and transverse stretchings was 55 meters/min.

The above film-forming and stretching procedures were carried out at varying film temperatures immediately before the roller 35 and at varying stretch ratios by changing the pre-heating temperatures by the hot rollers 31 to 34 and the conditions of an infrared heater 38 during the longitudinal stretching. The conditions, and the properties of the films are shown in Table 1.

characteristics becomes higher in proportion to the flatness of the film surface.

In Comparative Example 3 in which the stretching temperature was very high, there was an increased frequency of occurrence of uneven units in which the longitudinal diameter of the depressions was relatively large, and both the chroma S/N and dropout of a magnetic tape prepared by using the resulting stretched film increase undesirably. See FIG. 5 which is a microphotograph (900×) of the surface of the polyester film produced by Comparative Example 3. Compare this with FIG. 6 which is a microphotograph (900×) of the surface of a polyester film produced in accordance with Example 2 of the present invention.

Examples 6 to 8 and Comparative Example 5 and 6

The same procedure as in Example 1 was repeated

TABLE 1

| | Temperature of the film during longitudinal stretching (°C.) | Stretch ratio in the longitudinal direction | Kaoling Average diameter (μm) | Amount (wt. %) | Frequency of occurrence of uneven units per mm², N | | | | Surface roughness, CLA (μ) | Coefficient of friction (μk) | Chroma S/N (dB) | Comprehensive evaluation* |
|---|---|---|---|---|---|---|---|---|---|---|---|---|
| | | | | | 2≦D<5 (μm) | 5≦D<10 (μm) | 10≦D<30 (μm) | 30≦D (μm) | | | | |
| Example | | | | | | | | | | | | |
| 1 | 120 | 3.0 | 0.6 | 0.25 | 800 | 460 | 330 | 2 | 0.022 | 0.32 | +0.4 | |
| 2 | 120 | 3.3 | 0.6 | " | 570 | 350 | 180 | 1 | 0.024 | 0.35 | +0.2 | |
| 3 | 105 | 3.0 | 0.6 | " | 640 | 380 | 205 | 2 | 0.024 | 0.33 | +0.3 | |
| 4 | 105 | 3.3 | 0.6 | " | 350 | 240 | 105 | 0 | 0.027 | 0.38 | Standard | |
| 5 | 120 | 3.0 | 0.3 | " | 2100 | 500 | 440 | 2 | 0.013 | 0.35 | +1.5 | |
| Comparative Example | | | | | | | | | | | | |
| 1 | 95 | 3.6 | 0.6 | 0.25 | 70 | 35 | 14 | 0 | 0.032 | 0.42 | −1.0 | X |
| 2 | 80 | 3.6 | " | " | 20 | 10 | 2 | 0 | 0.033 | 0.43 | −1.3 | X |
| 3 | 130 | 3.0 | " | " | 1500 | 700 | 500 | 10 | 0.035 | 0.30 | −1.5 | X |
| 4 | 95 | 3.6 | 0.3 | 0.25 | 190 | 80 | 25 | 0 | 0.025 | 0.42 | 0 | X |

Remark
 and X represent excellent and poor characteristics, respectively.

In Examples 1 to 5 and Comparative Examples 1 to 4, the frequency of occurrence of uneven units on the surfaces of the films could be changed by changing the stretching conditions even when the same polymer was used to form the films. When the uneven units in accordance with this invention are formed on the surface of a film, the coefficient of friction of the film is greatly reduced despite the fact that its surface becomes flat. At the same time, the chroma (S/N value of the film which is a typical measure of its electromagnetic converting except that the type and amount of the particles were changed as shown in Table 2, and the longitudinal stretching was carried out at a film temperature of 120° C. at a stretch ratio of 3.0. The results are shown in Table 2.

TABLE 2

| | Particles added | | | Frequency of occurrence of uneven units per mm², N | | | | Surface roughness, CLA (μm) | Coefficient of friction (μk) | Chroma S/N (dB) | Comprehensive evaluation |
|---|---|---|---|---|---|---|---|---|---|---|---|
| | Type | Average diameter (μm) | Amount (wt. %) | 2≦D<5 (μm) | 5≦D<10 (μm) | 10≦D<30 (μm) | 30≦D (μm) | | | | |
| Comparative Example 5 | Silica | 0.02 | 0.4 | 70 | 60 | 13 | 0 | 0.008 | 0.43 | +2.5 | X |
| Example 6 | Barium sulfate | 0.6 | " | 1200 | 670 | 420 | 3 | 0.023 | 0.33 | +0.4 | |
| Example 7 | Barium sulfate + calcium carbonate | 0.6 | " | 1050 | 610 | 390 | 2 | 0.020 | 0.32 | +0.5 | |
| Example 8 | Calcium carbonate | 1.0 | " | 730 | 420 | 230 | 1 | 0.033 | 0.27 | −0.5 | |
| Comparative Example 6 | Calcium carbonate | 2.5 | " | 120 | 80 | 40 | 0 | 0.048 | 0.24 | −2.8 | X |

It is seen from Table 2 that the frequency of occurrence of uneven units on the surface of the film and the comprehensive evaluation are similar to those in Examples 1 to 5 and Comparative Examples 1 to 4. Since the frequency of occurrence of uneven units on the film surface differs depending upon the size and number of particles present in the film, it becomes small when the average particle diameter is as small as 0.02 μm as in Comparative Example 5 and as large as 2.0 μm as in Comparative Example 6. It is seen that many uneven units occur when the average particle diameter is in the range of 0.3 to 1.0 μm as in Examples 1 to 8.

In Example 7, a mixed powder of barium sulfate having an average particle diameter of 0.25 μm and calcium carbonate having an average particle diameter of 0.8 μm was used.

The standard tape for the chroma S/N was the tape obtained in Example 4.

Examples 9 and 10 and Comparative Examples 7 and 8

Polyethylene terephthalate was prepared in a customary manner using calcium acetate and lithium acetate as an ester interchange catalyst, antimony trioxide as a polymerization catalyst and trimethyl phosphate as a stabilizer. The amounts of the catalysts were changed to adjust the particle diameter and amount of the internally precipitated particles to those shown in Table 3. The polymer had an intrinsic viscosity of 0.65 dl/g (measured in o-chlorophenol at 35° C.).

The polymer was molded into films and tested in the same way as in Examples 6 to 8. The results are shown in Table 3.

It is seen that even when the formation of uneven units on the film surface was due to the internally precipitated particles, similar results to those in Examples 1 to 8 and Comparative Examples 1 to 6 were obtained.

having many uneven units on its surface, each of said uneven units being composed of a fine projection and a depression elliptically existing therearound, said polyester film being a copolymer obtained by the polycondensation of aromatic dibasic acids selected from the group consisting of terephthalic acid, isophthalic acid and naphthalene-2,6-dicarboxylic acid and glycols selected from the group consisting of ethylene glycol, tetramethylene glycol and neopentyl glycol; a homopolymer selected from the group consisting of polyethylene terephthalate, polybutylene terephthalate and polyethylene-2,6-naphthalenedicarboxylate; or a polymer blend of polyethylene terephthalate and an ethylene terephthalate/polyethylene glycol block copolymer; wherein each depression of the polyester film surface has an elliptical shape with a long diameter in the range of 2 μm to 50μm; and wherein the following relationship exists between the frequency of occurrence of the uneven units N (per $mm^2$) and the long diameter D (μm) of the depression on the surface of the film surface;

when $2 \leq D < 5$, $200 \leq N < 3500$,
when $5 \leq D < 10$, $150 \leq N < 2000$,
when $10 \leq D < 30$, $50 \leq N < 800$,
and
when $30 \leq D \leq 50$, $0 \leq N \leq 5$.

2. The biaxially oriented polyester film of claim 1 wherein each uneven unit consists of a projection formed owing to an inert additive and/or a catalyst residue contained in the polyester and a depression around it, said depression being of an elliptical shape having a long diameter along the second axial direction of the film.

TABLE 3

| | Particles | | Frequency of occurrence of uneven units per $mm^2$, N | | | | Surface roughness, CLA (μ) | Coefficient of friction (μk) | Chroma S/N (dB) | Comprehensive evaluation |
|---|---|---|---|---|---|---|---|---|---|---|
| | Average diameter (μm) | Amount (wt. %) | $2 \leq D < 5$ (μm) | $5 \leq D < 10$ (μm) | $10 \leq D < 30$ (μm) | $30 \leq D$ (μm) | | | | |
| Comparative Example 7 | 0.01 | 0.30 | 55 | 47 | 8 | 0 | 0.009 | 0.46 | +2.1 | X |
| Example 9 | 0.5 | 0.27 | 1550 | 980 | 450 | 5 | 0.024 | 0.30 | +0.7 | |
| Example 10 | 1.2 | 0.29 | 1100 | 750 | 430 | 5 | 0.026 | 0.29 | −0.1 | |
| Comparative Example 8 | 2.3 | 0.31 | 180 | 105 | 41 | 2 | 0.037 | 0.25 | −2.0 | X |

What is claimed is:

1. A biaxially oriented polyester film containing fine particles of inert additives therein characterized by

* * * * *